US007533636B2

(12) United States Patent
Marsh et al.

(10) Patent No.: US 7,533,636 B2
(45) Date of Patent: May 19, 2009

(54) SYSTEM, METHOD, AND COMPUTER READABLE MEDIA FOR CONTROLLING COOLING IN A DIESEL FUELED POWER GENERATION UNIT

(75) Inventors: Gregory A. Marsh, Erie, PA (US); Mahesh C. Aggarwal, Erie, PA (US)

(73) Assignee: General Electric Company, Schenectady, NY (US)

( * ) Notice: Subject to any disclaimer, the term of this patent is extended or adjusted under 35 U.S.C. 154(b) by 2 days.

(21) Appl. No.: 11/742,541

(22) Filed: Apr. 30, 2007

(65) Prior Publication Data

US 2008/0264359 A1 Oct. 30, 2008

(51) Int. Cl.
*F01P 11/08* (2006.01)

(52) U.S. Cl. ............................. 123/41.33; 123/196 AB

(58) Field of Classification Search ............... 123/41.33, 123/41.31, 196 AB; 60/599; 165/297
See application file for complete search history.

(56) References Cited

U.S. PATENT DOCUMENTS

| | | | |
|---|---|---|---|
| 5,415,147 A | 5/1995 | Nagle et al. | |
| 6,006,731 A | 12/1999 | Uzkan | |
| 6,098,576 A * | 8/2000 | Nowak, Jr. et al. | ........ 123/41.33 |
| 6,230,668 B1 | 5/2001 | Marsh et al. | |
| 6,499,298 B2 | 12/2002 | Uzkan | |
| 6,536,381 B2 * | 3/2003 | Langervik | ................ 123/41.33 |
| 6,604,515 B2 | 8/2003 | Marsh et al. | |
| 6,647,934 B2 * | 11/2003 | Marsh et al. | ............. 123/41.33 |
| 7,131,403 B1 | 11/2006 | Banga et al. | |
| 2002/0174653 A1 | 11/2002 | Uzkan | |
| 2004/0133315 A1 | 7/2004 | Kumar et al. | |
| 2004/0172175 A1 | 9/2004 | Julich et al. | |

FOREIGN PATENT DOCUMENTS

EP 1 136 969 9/2001

* cited by examiner

*Primary Examiner*—Stephen K. Cronin
*Assistant Examiner*—Hyder Ali
(74) *Attorney, Agent, or Firm*—Robert Wawrzyn, Esq.; Terry M. Sanks, Esq.; Beusse Wolter Sanks Mora & Maire, P.A.

(57) ABSTRACT

A system, method, and computer readable media for controlling cooling in a diesel fueled power generation unit. The system includes a first cooling circuit configurable in a first mode for directing an oil coolant portion into main oil cooler and an intercooler coolant portion into an intercooler and configurable in a second mode for limiting the oil coolant portion provided to the main oil cooler. The system also includes a supplementary oil cooler for cooling a portion of the lubrication oil and a supplementary coolant source for providing a second coolant flow to the supplementary oil cooler. The system also includes a second cooling circuit in communication with the supplementary oil cooler configurable in the first mode for limiting the portion of the lubrication oil provided to the supplementary oil cooler and configurable in the second mode for directing the portion of the lubrication oil to the supplementary air oil cooler.

27 Claims, 3 Drawing Sheets

SYSTEM, METHOD, AND COMPUTER READABLE MEDIA FOR CONTROLLING COOLING IN A DIESEL FUELED POWER GENERATION UNIT

FIELD OF THE INVENTION

The field of the invention relates to a diesel powered system, such as a train, off highway vehicle, marine and/or stationary diesel powered system and, more particularly, to a system, method, and computer readable media for controlling cooling in a diesel-fueled power generation unit.

BACKGROUND

Diesel powered systems such as, but not limited to, off-road vehicles, marine diesel powered propulsion plants, stationary diesel powered system and rail vehicle systems, or trains, are usually powered by a diesel power unit. With respect to rail vehicle systems, the diesel power unit is part of at least one locomotive and the train further includes a plurality of rail cars, such as freight cars. Locomotives are complex systems with numerous subsystems, with each subsystem being interdependent on other subsystems.

Diesel fueled power units typically require cooling systems to limit the temperatures of various engine components. Internal combustion engines have internal cooling passages for the circulation of coolant to remove heat energy from the engine components. Lubricating oil which is circulated throughout the engine to reduce friction will also absorb heat and, therefore, will also require cooling to avoid reaching temperatures that would detrimentally affect its lubricity. Diesel engines often utilize turbochargers to increase power by compressing the intake combustion air to a higher density. Such compression results in the heating of the combustion air, which must then be cooled prior to its use to enable the engine to have high volumetric efficiency and low emissions of exhaust pollutants. For mobile applications such as rail locomotives, the only readily available heat sink is the surrounding ambient air. It is known to utilize a pumped cooling medium, such as water, to transport heat to finned radiator tubes. The radiator tubes then transfer the heat to the ambient air, often using forced convection provided by fans.

It is often desirable to maintain an internal combustion engine and its associated intake combustion air at multiple different temperatures in order to optimize the performance of the engine. Consequently, coolant at one temperature may be provided to the cylinder jackets of a turbocharged diesel engine and coolant at a lower temperature may be provided to an intercooler for cooling the compressed combustion air. Such a system may use a single pump, heat exchanger, and temperature control valve to accomplish the dual cooling objectives.

Other turbocharged diesel engine cooling schemes may use a subcooler in addition to a radiator. The subcooler is typically located upstream of the radiator in a flow of cooling ambient air. For locomotive applications, ambient air flowing through the radiators is normally provided by a multi-speed fan, since the radiators are positioned on the roof of the locomotive. The use of a subcooler provides a greater temperature difference capability between the temperature of the engine and the temperature of the combustion air.

Diesel engines may also use cooled fluid and/or compressed fluid cooling systems to cool lubricant fluids, such as engine lubrication oil. For example, heated engine oil coming from the engine may be passed through an oil cooler having an oil/coolant heat exchanger supplied with a coolant at a lower temperature than the oil to transfer heat from the oil to the coolant. Typically, the coolant includes water and/or a water antifreeze mixture cooled in the radiator and/or one or more associated sub-coolers. Additional oil cooling may be provided using a compressed coolant cooling scheme.

Conventional turbocharged diesel powered locomotives may use a cooling circuit that selectively uses a sub-cooler radiator section to provide sub cooled water or an antifreeze/water mixture to an oil cooler and/or the turbocharger compressor intercooler. At lower ambient temperatures and or low load conditions, the conventional locomotive cooling circuit may provide coolant to both the oil cooler and the intercooler to maintain a desired engine oil temperature and a desired emission level produced by the engine. During operation in high ambient temperatures and/or at high engine loading, it may not be possible to provide sufficient cooling capacity from the coolant in the circuit to cool the engine oil without sacrificing cooling of another cooled component, such as the intercooler. Consequently, at higher ambient temperatures and/or higher loads, coolant supplied to the intercooler may be redirected to the oil cooler to preferentially cool the engine oil at the expense of higher pollutant emission. For example, U.S. Pat. No. 7,131,403 describes one such cooling system for maintaining sufficient coolant flows to the intercooler and oil cooler for providing lower NOx emissions at ambient temperatures up to about 80° Farenheit (F.). Above 80° F. ambient, the cooling system may be configured for routing coolant flows so as to protect the engine by not exceeding oil temperature limits, but at the expense of producing higher NOx emissions.

Owners and/or operators of locomotives, off-road vehicles, marine diesel powered propulsion plants, and/or stationary diesel powered systems desire to optimize cooling of diesel fueled power generation units used in these applications over a wide range of operating conditions and ambient environments.

BRIEF SUMMARY OF THE INVENTION

In one embodiment of the present invention, a cooling system is provided for a diesel powered system having at least one diesel-fueled power generation unit, an intercooler for cooling power generation unit intake air, and main oil cooler for cooling power generation unit lubrication oil, each having respective cooling passages formed therein, and a main coolant source for providing a first coolant flow to the cooling passages. The cooling system includes a first cooling circuit in communication with the intercooler and the main oil cooler configurable in a first mode for directing an oil coolant portion of the first coolant flow into the main oil cooler and a intercooler coolant portion of the first coolant flow into the intercooler when a cooling capability of the first coolant flow in the first cooling circuit is sufficient for cooling the lubrication oil to achieve a desired oil temperature and for cooling the intake air to achieve a desired emission level produced by the power generation unit, and configurable in a second mode for limiting the oil coolant portion provided to the main oil cooler. The cooling system also includes a supplementary oil cooler for cooling a portion of the lubrication oil and a supplementary coolant source for providing a second coolant flow to the supplementary oil cooler. The cooling system also includes a second cooling circuit in communication with the supplementary oil cooler configurable in the first mode for limiting the portion of the lubrication oil provided to the supplementary oil cooler and configurable in the second mode for directing the portion of the lubrication oil to the supplementary air oil cooler.

In another embodiment of the present invention, a cooling method is provided for a diesel powered system having at least one diesel-fueled power generation unit, an intercooler for cooling power generation unit intake air and a main oil cooler for cooling diesel-fueled power generation unit lubrication oil, each having respective cooling passages formed therein, a first coolant source for providing a first coolant flow to the cooling passages, a supplementary oil cooler for cooling a portion of the engine lubrication oil, and a supplementary coolant source for providing a second coolant flow to the supplementary oil cooler. The method includes directing, in a first mode, an oil coolant portion of the first coolant flow to the main oil cooler and a intercooler coolant portion of the first coolant flow to the intercooler when a cooling capability of the first coolant flow is sufficient for cooling the lubrication oil to achieve a desired oil temperature and for cooling the intake air to achieve a desired emission level produced by the power generation unit. The method also includes limiting, in the first mode, the portion of the engine lubrication oil provided to the supplementary oil cooler, limiting, in a second mode, the oil coolant portion of the coolant flow to the main oil cooler when a cooling capability of the first coolant is insufficient for cooling the lubrication oil and maintaining a desired emission level produced by the engine. The method also includes directing, in the second mode, the portion of the engine lubrication oil to the supplementary oil cooler.

In another embodiment of the present invention, computer readable media containing program instructions for controlling cooling of a diesel powered system is provided. The computer readable media includes a computer program code for directing, in a first mode, an oil coolant portion of the first coolant flow to the main oil cooler and a intercooler coolant portion of the first coolant flow to the intercooler when a cooling capability of the first coolant flow is sufficient for cooling the lubrication oil to achieve a desired oil temperature and for cooling the intake air to achieve a desired emission level produced by the power generation unit. The computer readable media includes a computer program code for limiting, in the first mode, the portion of the engine lubrication oil provided to the supplementary oil cooler and a computer program code for limiting, in a second mode, the oil coolant portion of the coolant flow to the main oil cooler when a cooling capability of the first coolant is insufficient for cooling the lubrication oil and maintaining a desired emission level produced by the engine. The computer readable media includes a computer program code for directing, in the second mode, the portion of the engine lubrication oil to the supplementary oil cooler.

BRIEF DESCRIPTION OF THE DRAWINGS

A more particular description of the invention briefly described above will be rendered by reference to specific embodiments thereof that are illustrated in the appended drawings. These drawings depict only typical embodiments of the invention and are not therefore to be considered to be limiting of its scope.

DETAILED DESCRIPTION OF THE INVENTION

Figure 1:
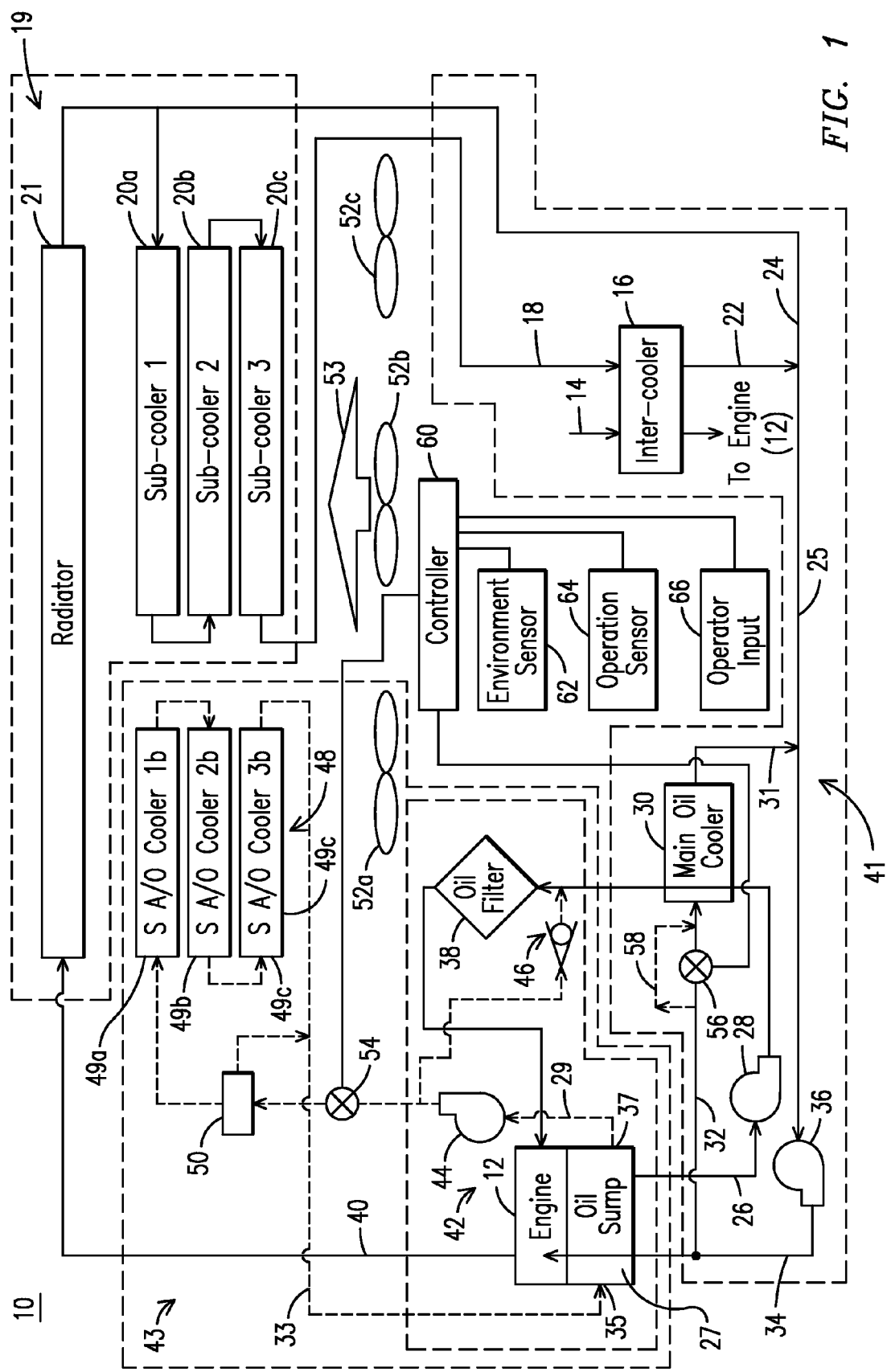
FIG. 1 is a schematic diagram of an exemplary embodiment of a cooling system for a turbocharged diesel engine.

Reference will now be made in detail to the embodiments consistent with the invention, examples of which are illustrated in the accompanying drawings. Wherever possible, the same reference numerals used throughout the drawings refer to the same or like parts.

Though exemplary embodiments of the present invention are described with respect to rail vehicles, specifically trains and locomotives having diesel engines, exemplary embodiments of the invention are also applicable for other uses, such as but not limited to off-road vehicles, marine vessels, and stationary units, each which may use a diesel engine. For example, with respect to a stationary power generating station, a plurality of stations may be grouped together collectively generating power for a specific location and/or purpose. In another exemplary embodiment, a single station is provided, but with a plurality of generators making up the single station. Towards this end, when discussing a specified mission, this includes a task or requirement to be performed by the diesel powered system. Therefore, with respect to railway, marine or off-road vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power-generating unit may include one or more of speed, load, fueling value, timing, etc.

In one exemplary example involving marine vessels, a plurality of tugs may be operating together where all are moving the same larger vessel, where each tug is linked in time to accomplish the mission of moving the larger vessel. In another exemplary example a single marine vessel may have a plurality of engines. Off Highway Vehicle (OHV) may involve a fleet of vehicles that have a same mission to move earth, from location A to location B, where each OHV is linked in time to accomplish the mission.

To allow continued cooling of the engine intake air to maintain emissions at desired levels while still providing sufficient engine oil cooling, the inventors of the present invention have developed an innovative oil cooling technique. The oil cooling technique employs a supplementary oil cooler cooled by forced ambient air to increase a cooling capacity of the oil cooling circuit, for example, during high ambient temperature and/or high engine load conditions. The supplementary oil cooler advantageously increases an efficiency of engine oil cooling by taking advantage of ambient air temperatures cooler than the oil. During high temperature/high load conditions, the radiator sub-coolers may be exclusively for cooling only the engine intake air temperature. In another aspect an existing pre-lubrication oil pump system may modified for use with the supplementary oil cooler.

For example, in a first cooling mode, coolant from a radiator sub-cooler of a turbocharged diesel engine cooling system may be used for cooling engine intake air temperature via the intercooler, while coolant from a radiator may be used for cooling the engine lubricating oil via a main oil cooler. In a second cooling mode, coolant flow to the oil cooler may be limited and a portion of the oil may be directed to a supplementary oil cooler for maintaining a desired overall oil temperature. Consequently, a cooling capacity of the coolant provided to the intercooler may be achieved in the second mode sufficient to cool the intake air to maintain a desired emission level.

FIG. 1 is schematic diagram of an exemplary embodiment of a cooling system 10 for a turbocharged diesel engine 12, such as may be used in a rail locomotive, configured in a first cooling mode. The cooling system 10 may include a turbocharged diesel engine 12 receiving a flow of combustion air 14 through an intercooler 16 configured for cooling the combustion air 14. In a first cooling circuit 41, combustion air 14 flowing through the intercooler 16 may be cooled by an intercooler coolant portion 18 of a coolant flow provided by a coolant source 19. For example, intercooler coolant portion 18 may be sourced from one or more of subcoolers 20a, 20b, 20c of the coolant source 19. The intercooler 16 may include a heat exchanger disposed in the combustion air flow 14 within the intercooler 16 for transferring heat from the combustion air 14 to the intercooler coolant portion 18. Heated intercooler coolant portion 22 discharged by the intercooler 16 may be mixed with a radiator portion 24 of the coolant flow being provided to the engine 12 to form a mixed coolant flow 25. The engine 12 may include cooling passages receiving an engine portion 34 of the mixed coolant flow 25 being recirculated by water pump 36 back through radiator 21 and one or more subcoolers 20a, 20b, 20c. The subcoolers 20a, 20b, 20c provide successively cooler coolant temperatures, so that, for example, the intercooler coolant portion 18 exiting sub cooler 20c is cooler than coolant exiting the radiator 21.

The engine 12 also includes lubricating oil passages and an oil sump 27 that receive a flow of oil lubricating 26 recirculated by main oil pump 28, such as a mechanically operated, relatively high pressure pump, through a main oil cooler 30 and an oil filter 38. Oil 26 flowing though the main oil cooler 30 may be cooled by an oil coolant portion 32 of the mixed coolant flow 25, using, for example, a heat exchanger disposed in the oil coolant portion 32 within the main oil cooler 30. Heated oil coolant portion 31 discharged by the main oil cooler 30 may be injected into the mixed coolant flow 25 and recirculated back through the engine 12 with assistance from coolant pump 36. In an aspect of the invention, an amount of the oil coolant portion 32 provided to the main oil cooler 30 may be controlled to achieve a desired emission level produced by the engine 12, such as by limiting an amount of the oil coolant portion 32 delivered to the main oil cooler 30 to provide preferential cooling of the engine intake air via intercooler 16, so as to limit NOx production. By limiting an amount of the oil coolant portion 32 provided to the main oil cooler 30, a temperature of engine heated coolant 40 returned to the coolant source 19 may remain cooler and thus retain more cooling capacity for cooling the intake air 14 when recirculated to the intercooler 16.

The system 10 may also include a pre-lubrication oil circuit 42 configured for providing a pre-lubrication flow of oil to the engine 12 prior to and/or during starting of the engine 12. The pre-lubrication oil circuit 42 may include a relatively low pressure pump 44, such as an electrically operated pump, for pumping an oil portion 29, such as pre-lubrication oil, from the oil sump 27 through a backflow check valve 46 to an inlet of the oil filter 38 and back through the lubricating oil passages of the engine 12. The backflow check valve 46 may be configured to open during pre-lubrication at engine start and close responsive to engine mechanical oil pump 28 pressure at engine running conditions.

In an aspect of the invention, the pre-lubrication oil circuit 42 may be configured to be part of a second cooling circuit 43 for providing supplementary cooling of oil portion 29. The second cooling circuit 43 may be configured in a second cooling mode to maintain a desired overall oil temperature. The second cooling circuit 43 may include a supplementary oil cooler 48, that may include one or more subcoolers 49a, 49b, 49c. The supplementary oil cooler 48 may be configured as an oil/air heat exchanger being cooled by forced air 53 provided by one or more radiator fans 52a, 52b, 52c. In an embodiment of the invention, the supplementary oil cooler 48 may be integrated into a sub-cooler space of the radiator 21 for exposure to a cooling fan 52. In an embodiment, the supplementary oil cooler 48 may be disposed proximate a cooling fan 52a nearest the engine 12 so as to allow collection of any oil that may leak from the supplementary oil cooler 48 in an existing collection sump and retention tank. In addition, by positioning the supplementary oil cooler 48 close to the engine 12, a length of fluid conductors between the engine 12 and the supplementary oil cooler 48 may be minimized. Mixing of cooled oil portion 33 with the engine heated oil 26 occurs in oil sump 27. Consequently, heat from oil 26 may be transferred to the cooled oil portion 33 in sump 27 during a travel time of the cooled oil portion 33 from an inlet 35 of the sump 27 to an outlet 37 of the sump 27. The inlet 35 of the sump 27 and the outlet 37 of the sump 27 may be disposed remotely form one another to achieve a desired travel time and, accordingly, provide a desired heat transfer during the travel time.

In an aspect of the invention, the second cooling circuit 43 may include a thermostat 50 for controlling a flow of portion 29 of the oil 26 to the supplementary oil cooler 48 responsive to a temperature of the portion 29 of the oil 26. For example, the thermostat 50 may be used to maintain an oil temperature of about 160° F. Thermostatic control of oil temperature in the second cooling circuit 43 may be desired because a fan 52a, for example, running at full speed in ambient temperatures of lower than about 100° F., may provide more cooling of the oil than necessary. Accordingly, the thermostat 50 may act to control a temperature of the oil independently of a fan speed.

To accomplish supplementary cooling, a larger capacity pre-lubrication oil pump may need to be used. A relatively low pressure pump, such as a conventional type pre-lubrication pump, may still be used instead of a higher pressure pump because the portion 29 of the oil 26 circulated through the second cooling circuit 43 expected to be less than about 50% of the oil 26 being circulated through the main oil cooler 30. In addition, it is expected that the portion 29 of the oil 26 circulated through the second cooling circuit 43 will have a lower viscosity due to a higher temperature of the portion thereby not requiring a higher-pressure pump.

In an aspect of the invention, the first and second cooling modes may be controlled by respective valves 54, 56 to provide desired oil cooling while maintaining desired operating conditions of the engine 12. Actuation of the valves 54, 56 may be controlled by controller 60 via electric and/or air actuation. In an embodiment, a two-way valve 56 may be provided to selectively control oil coolant portion 32 provided to the main oil cooler 30. A valve bypass circuit 58 around the valve 56 may be provided to insure that a trickle flow of coolant is provided to the main oil cooler 30 when the valve is closed. The trickle flow may be used to limit steam formation and/or evaporation inside the main oil cooler 30 and/or to provide coolant flushing within the main oil cooler 30. The amount of the trickle flow may be controlled to limit heating of the oil 26 when the oil coolant portion 32 temperature is greater than the oil 26 temperature. In another embodiment, the valve 56 may be configured to control the flow of oil coolant portion 32 to the main oil cooler 30 to ensure that the oil 26 does not increase in temperature during the second cooling mode as a temperature of the oil coolant portion 32 may be greater than a temperature of the oil 26 when operating in the second mode.

A two way valve 54 may be provided to selectively oil portion 29 provided to the supplementary oil cooler 48. As understood in the art, the backflow check valve 46 will open during pre-lubrication at engine start and will close due to engine mechanical oil pump pressure at engine running conditions, thereby keeping the oil portion 29 in the second cooling circuit 43. This allows a simple two way ported selector valve instead of a more complicated three way valve component to be used as valve 58.

The cooling system 10 may be provided with a controller 60 for implementing steps necessary for controlling cooling within the system 12, such as by positioning of the valves 54, 56 to control the flow of oil coolant portion 32 to the main oil cooler 30 and oil portion 29 to the supplementary oil cooler 48 to achieve desired operating conditions of the engine 12. Controller 60 may take any form known in the art, for example an analog or digital microprocessor or computer, and it may be integrated into or combined with one or more controllers used for other functions related to the operation of the engine 12. The controller 60 may be configured to controlling cooling corresponding to a desired engine operating mode, such as a mode that optimizes emissions, engine power, fuel efficiency, or engine durability. In an embodiment, an operational mode may be automatically or manually selected based on an environmental condition proximate the locomotive, such as an ambient temperature and/or altitude. The steps necessary for such processes may be embodied in hardware, software and/or firmware in any form that is accessible and executable by controller 60 and may be stored on any medium that is convenient for the particular application.

In an aspect of the invention, the controller 60 receives input signals from one or more sources, such as an environment sensor 62, a locomotive operation sensor 64 and/or an operator input 66. The environment sensor 62 may include an ambient temperature sensor and/or an altimeter. The locomotive operation sensor may include one or more coolant water temperature sensors, oil temperature sensors, a horse power demand control, and/or emissions sensors. An operator input may include a locomotive operation command input by a locomotive operator operating the locomotive that may include a specific operation mode command. Based on such inputs, the controller 60 may operate the flow control valves 54, 56 to achieve desired oil cooling while maintaining a desired engine operating mode. In another aspect, the controller 60 may control other components, such as other valves, pumps, fans, and/or thermostats to control flows of coolant, oil, and air in the system 10. For example, controller 60 may control an operation of pre-lubrication pump 44 to activate the pump 44 when valve 54 is opened so that oil portion 29 may be pumped to the supplementary oil cooler 48.

The cooling system 10 may include multiple modes of operation that may be controlled by controller 60. For example, through controlled selection of routing of coolant flows and oil flows, priority may be given to sending coolant to the intercooler 16 instead of the oil cooler 30, depending on a desired mode of operation. FIG. 1 shows positioning of flow control valves 54, 56 for a first mode of cooling for providing the oil coolant portion 32 to the main oil cooler 30 and the intercooler 16 when a cooling capability of the coolant in the circuit 41 is sufficient for cooling the engine lubrication oil 26 and the engine intake air 14 to maintain a desired engine oil temperature and a desired emission level produced by the engine 12. This first mode may be used at lower ambient temperatures and/or lower locomotive throttle notch settings. In the first mode, valve 56 may be positioned, for example, by controller 60, to be open to allow the oil coolant portion 32 to enter the main oil cooler 30. Accordingly, cooling of the combustion air 14 and the oil 26 flowing through the main oil cooler 30 may be achieved. In the first mode, valve 54 may be positioned, for example, by controller 60, to be closed to limit or prevent oil flowing into the supplementary oil cooler 48 since supplementary oil cooling may not be needed in the first mode. The dotted line indications shown in the second cooling circuit 43 are intended to indicate limited or no oil flow in the second circuit 43.

Figure 2:
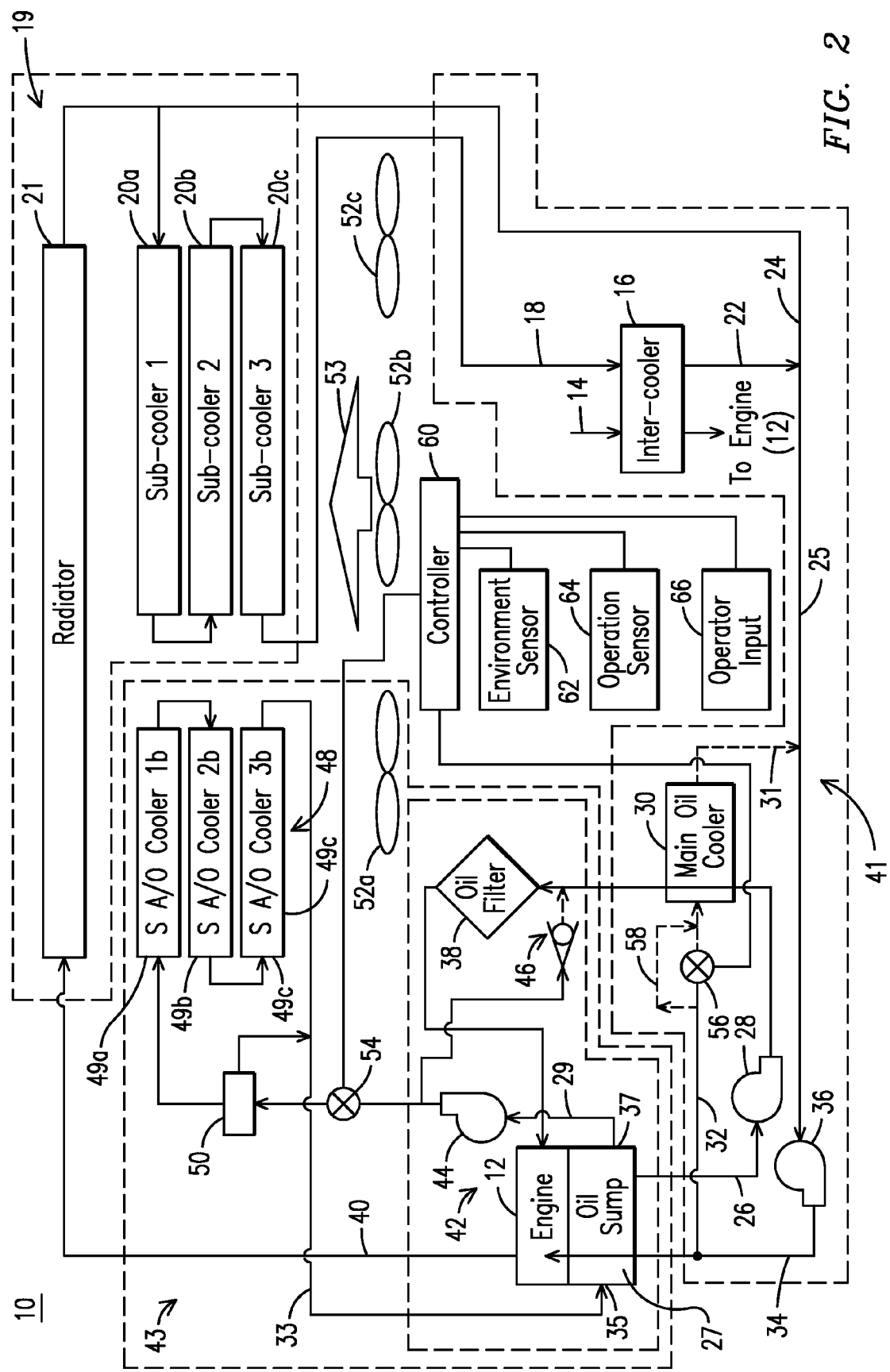
FIG. 2 is a schematic diagram of the cooling system of FIG. 1 configured in a different cooling mode.

FIG. 2 shows a second mode of controlling cooling in a diesel engine by that limits oil coolant portion 32 provided to the main oil cooler 30 and directs the oil portion 29 to the supplementary oil cooler 28 when a cooling capability of the coolant provided by the coolant source 19 is insufficient for cooling the crankcase oil and maintaining a desired emission level produced by the engine. In the second mode, valve 56 may be positioned to limit oil coolant portion 32 provided to the main oil cooler 30, so that heat normally added the oil coolant portion 32 when flowing through the main oil cooler 30 is not added to the coolant. Consequently, the coolant in the first cooling circuit 41 retains cooling capacity that would otherwise be lost in the main oil cooler 30. This retained cooling capacity may be used to preferentially cool the engine intake air 14 via intercooler 16. In the second cooling mode, a trickle amount of oil coolant portion 32 may be allowed to bypass the valve 56, for example, when the valve 56 is closed, or, alternatively a trickle amount of oil coolant portion 32 may be allowed through the valve 56. In the second mode, valve 54 may be positioned to direct oil portion 29 to the supplementary oil cooler 48 when a cooling capability of the coolant in the first cooling circuit 41 is insufficient for cooling the crankcase oil and maintaining a desired emission level produced by the engine. In an example embodiment, the second cooling mode may be implemented when a power requested by a locomotive operator is greater than a certain engine throttle level setting, such as notch 7, and/or the ambient temperature is above 60° F. When the load or power level is reduced, the system 10 may be returned to the first cooling mode.

Although it is envisioned that it may be possible to use the supplementary cooler 48 for cooling all the engine oil, the main oil cooler 30 may be retained in the system 10 for several reasons. For example, a service life of the supplementary oil cooler 48 may be extended by limiting its use to periods of extreme operating conditions such as when operating at relatively high engine loads and/or relatively high ambient temperatures, such as may be encountered when traversing tunnels. For example, ambient temperatures in a tunnel may reach 250° F. under certain operating conditions such as slow train speed and/or high altitude and/or high ambient temperature and/or long tunnels. It also is reduced in size but provides oil cooling at lower loads. In addition, the main oil cooler 30 may be reduced in size due to a reduced oil cooling capacity requirement provide by the supplementary cooler.

Figure 3:
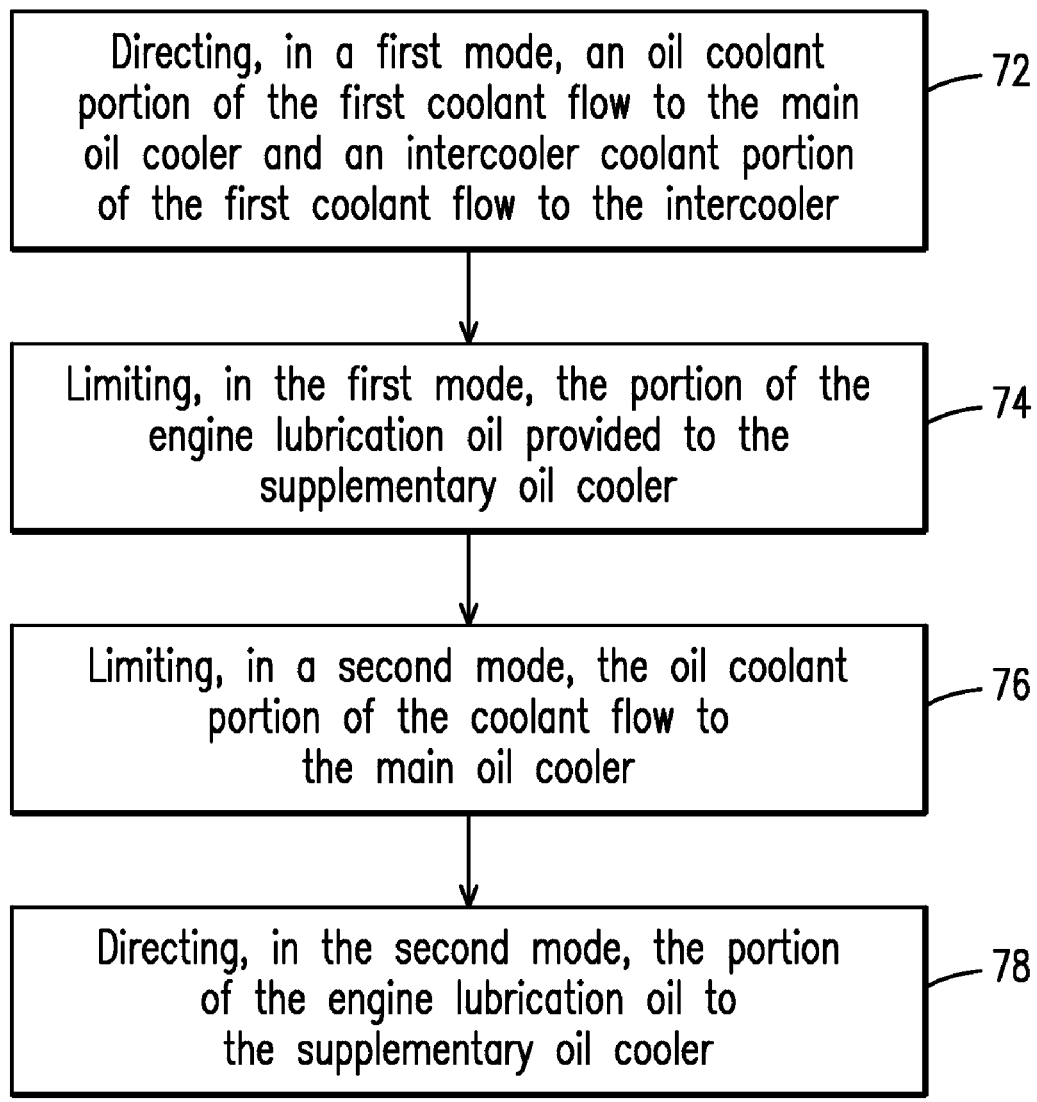
FIG. 3 is a flow diagram of an example method for controlling cooling in a turbocharged diesel engine.

FIG. 3 shows a flow diagram 70 for an example embodiment of a method for providing cooling control of a diesel engine. The method may include a first step 72 of directing, in a first mode, an oil coolant portion of the first coolant flow to the main oil cooler and a intercooler coolant portion of the first coolant flow to the intercooler 72 when a cooling capability of the first coolant flow is sufficient for cooling the lubrication oil and the intake air effective to achieve a desired oil temperature and a desired emission level produced by the power generation unit. The method may then include in a second step 74 limiting, in the first mode, the portion of the engine lubrication oil provided to the supplementary oil cooler. In a second mode, the method may include in a third step 76 limiting the oil coolant portion of the coolant flow to the main oil cooler when a cooling capability of the first coolant is insufficient for cooling the lubrication oil, and maintaining a desired emission level produced by the engine. In a fourth step 78, the method may include directing the portion of the engine lubrication oil to the supplementary oil cooler.

Although not specifically shown in the flow diagram 70, but readily understandable by one skilled in the art, the method may also include selectively implementing the first and second modes responsive to an input from an environmental sensor sensing an environmental condition proximate the diesel powered system. The method may also include selectively implementing the first and second modes responsive to an input from a diesel powered system operation sensor sensing an operational condition of the diesel powered system. The method may further include selectively implementing the first and second modes responsive to a control signal provided by an operator of the diesel powered system. The method may include implementing the second mode when the ambient temperature proximate the diesel powered system is above a predetermined value at a predetermined operating altitude or implementing the second mode when the diesel powered system is operating in a condition wherein an emissions requirement is waived. The method may include implementing the first mode when the ambient temperature proximate the diesel powered system is within a predetermined range at a predetermined operating altitude.

Based on the foregoing specification, the invention may be implemented using computer programming or engineering techniques including computer software, firmware, hardware or any combination or subset thereof, wherein the technical effect is to control cooling of a diesel fueled power-generating unit. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While exemplary embodiments of the invention have been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cooling system for a diesel powered system having at least one diesel-fueled power generation unit, an intercooler for cooling power generation unit intake air, and main oil cooler for cooling power generation unit lubrication oil, each having respective cooling passages formed therein, and a main coolant source for providing a first coolant flow to the cooling passages, the cooling system comprising:
   a first cooling circuit in communication with the intercooler and the main oil cooler configurable in a first mode for directing an oil coolant portion of the first coolant flow into the main oil cooler and a intercooler coolant portion of the first coolant flow into the intercooler when a cooling capability of the first coolant flow in the first cooling circuit is sufficient for cooling the lubrication oil to achieve a desired oil temperature and for cooling the intake air to achieve a desired emission level produced by the power generation unit, and configurable in a second mode for limiting the oil coolant portion provided to the main oil cooler;
   a supplementary oil cooler for cooling a portion of the lubrication oil connected in parallel with the main oil cooler;
   a supplementary coolant source for providing a second coolant flow to the supplementary oil cooler; and
   a second cooling circuit in communication with the supplementary oil cooler configurable in the first mode for limiting the portion of the lubrication oil provided to the supplementary oil cooler and configurable in the second mode for directing the portion of the lubrication oil to the supplementary oil cooler.

2. The cooling system of claim 1, further comprising a first valve for selectively controlling the oil coolant portion being provided to the main oil cooler.

3. The cooling system of claim 2, further comprising a second valve for selectively controlling the portion of the lubrication oil being provided to the supplementary oil cooler.

4. The cooling system of claim 3, further comprising a controller for controlling respective positions of the first valve and the second valve to selectively configure the cooling system in the first mode and second mode according to an input received by the controller.

5. The cooling system of claim 4, wherein the input comprises a signal provided by environmental sensor sensing an environmental condition proximate the diesel powered system.

6. The cooling system of claim 4, wherein the input comprises a signal provided by diesel powered system operation sensor sensing an operational condition of the diesel powered system.

7. The cooling system of claim 6, wherein the diesel powered system operation sensor comprises a coolant temperature sensor, an oil temperature sensor, or an emission sensor.

8. The cooling system of claim 4, wherein the input comprises a control signal provided by an operator of the diesel powered system.

9. The cooling system of claim 1, wherein the diesel powered system comprises a railway transportation system, and wherein the diesel-fueled power generating unit comprises at least one locomotive powered by at least one diesel internal combustion engine.

10. The cooling system of claim 1, wherein the diesel powered system comprises a marine vessel, and wherein the diesel-fueled power generating unit comprises at least one diesel internal combustion engine.

11. The cooling system of claim 1, wherein the diesel powered system comprises an off-road vehicle, and wherein the diesel-fueled power generating unit comprises at least one diesel internal combustion engine.

12. The cooling system of claim 1, wherein the diesel powered system comprises a stationary power generating station, and wherein the diesel-fueled power generating unit comprises at least one diesel internal combustion engine.

13. The cooling system of claim 1, wherein the diesel powered system comprises a network of stationary power generating stations, and wherein the diesel-fueled power generating unit comprises at least one diesel internal combustion engine.

14. The cooling method of claim 1, wherein the second coolant flow comprises forced air.

15. A cooling method for a diesel powered system having at least one diesel-fueled power generation unit, an intercooler for cooling power generation unit intake air and a main oil cooler for cooling diesel-fueled power generation unit lubrication oil, each having respective cooling passages formed therein, a first coolant source for providing a first coolant flow to the cooling passages, a supplementary oil cooler connected in parallel to the main oil cooler for cooling a portion of the engine lubrication oil, and a supplementary coolant source for providing a second coolant flow to the supplementary oil cooler, the method comprising:
- directing, in a first mode, an oil coolant portion of the first coolant flow to the main oil cooler and a intercooler coolant portion of the first coolant flow to the intercooler when a cooling capability of the first coolant flow is sufficient for cooling the lubrication oil to achieve a desired oil temperature and for cooling the intake air to achieve a desired emission level produced by the power generation unit;
- limiting, in the first mode, the portion of the engine lubrication oil provided to the supplementary oil cooler connected in parallel to the main oil cooler;
- limiting, in a second mode, the oil coolant portion of the coolant flow to the main oil cooler when a cooling capability of the first coolant is insufficient for cooling the lubrication oil and maintaining a desired emission level produced by the engine; and
- directing, in the second mode, the portion of the engine lubrication oil to the supplementary oil cooler.

16. The method of claim 15, further comprising selectively implementing the first and second modes responsive to an input from an environmental sensor sensing an environmental condition proximate the diesel powered system.

17. The method of claim 15, further comprising selectively implementing the first and second modes responsive to an input from a diesel powered system operation sensor sensing an operational condition of the diesel powered system.

18. The method of claim 15, further comprising selectively implementing the first and second modes responsive to a control signal provided by an operator of the diesel powered system.

19. The method of claim 15, further comprising implementing the second mode when the ambient temperature proximate the diesel powered system is above a predetermined value at a predetermined operating altitude.

20. The method of claim 15, further comprising implementing the second mode when the diesel powered system is operating in a condition wherein an emissions requirement is waived.

21. The method of claim 15, further comprising implementing the first mode when the ambient temperature proximate the diesel powered system is within a predetermined range at a predetermined operating altitude.

22. The method of claim 15, wherein the diesel powered system comprises a railway transportation system, and wherein the diesel-fueled power generating unit comprises at least one locomotive powered by at least one diesel internal combustion engine.

23. The method of claim 15, wherein the diesel powered system comprises a marine vessel, and wherein the diesel-fueled power generating unit comprises at least one diesel internal combustion engine.

24. The method of claim 15, wherein the diesel powered system comprises an off-road vehicle, and wherein the diesel-fueled power generating unit comprises at least one diesel internal combustion engine.

25. The method of claim 15, wherein the diesel powered system comprises a stationary power generating station, and wherein the diesel-fueled power generating unit comprises at least one diesel internal combustion engine.

26. The method of claim 15, wherein the diesel powered system comprises a network of stationary power generating stations, and wherein the diesel-fueled power generating unit comprises at least one diesel internal combustion engine.

27. In a diesel powered system having at least one diesel-fueled power generation unit, an intercooler for cooling power generation unit intake air and a main oil cooler for cooling diesel-fueled power generation unit lubrication oil, each having respective cooling passages formed therein, a first coolant source for providing a first coolant flow to the cooling passages, a supplementary oil cooler connected in parallel to the main oil cooler for cooling a portion of the engine lubrication oil, and a supplementary coolant source for providing a second coolant flow to the supplementary oil cooler, computer readable media containing program instructions for controlling cooling of the diesel powered system, the computer readable media comprising:
- a computer program code for directing, in a first mode, an oil coolant portion of the first coolant flow to the main oil cooler and a intercooler coolant portion of the first coolant flow to the intercooler when a cooling capability of the first coolant flow is sufficient for cooling the lubrication oil to achieve a desired oil temperature and for cooling the intake air to achieve a desired emission level produced by the power generation unit;
- a computer program code for limiting, in the first mode, the portion of the engine lubrication oil provided to the supplementary oil cooler connected in parallel to the main oil cooler;
- a computer program code for limiting, in a second mode, the oil coolant portion of the coolant flow to the main oil cooler when a cooling capability of the first coolant is insufficient for cooling the lubrication oil and maintaining a desired emission level produced by the engine; and
- a computer program code for directing, in the second mode, the portion of the engine lubrication oil to the supplementary oil cooler.

* * * * *